US012790160B2

(12) United States Patent
Nakao et al.

(10) Patent No.: US 12,790,160 B2
(45) Date of Patent: Nov. 10, 2026

(54) THREADLIKE ADHESIVE STICKING APPARATUS AND THREADLIKE ADHESIVE STICKING METHOD

(71) Applicant: NITTO DENKO CORPORATION, Ibaraki (JP)

(72) Inventors: Eriko Nakao, Ibaraki (JP); Yosuke Makihata, Ibaraki (JP); Shigeki Ishiguro, Ibaraki (JP); Kayo Shimokawa, Ibaraki (JP)

(73) Assignee: NITTO DENKO CORPORATION, Ibaraki (JP)

(*) Notice: Subject to any disclaimer, the term of this patent is extended or adjusted under 35 U.S.C. 154(b) by 27 days.

(21) Appl. No.: 19/116,206

(22) PCT Filed: Sep. 26, 2023

(86) PCT No.: PCT/JP2023/035039
§ 371 (c)(1),
(2) Date: Mar. 27, 2025

(87) PCT Pub. No.: WO2024/071149
PCT Pub. Date: Apr. 4, 2024

(65) Prior Publication Data

US 2026/0021994 A1 Jan. 22, 2026

(30) Foreign Application Priority Data

Sep. 29, 2022 (JP) ................................ 2022-156912

(51) Int. Cl.
*B65H 37/04* (2006.01)
*C09J 5/00* (2006.01)

(52) U.S. Cl.
CPC ................ *B65H 37/04* (2013.01); *C09J 5/00* (2013.01)

(58) Field of Classification Search
CPC .......... B65H 37/04; B65H 2301/44318; B65H 2301/51531; B65H 2701/377; B65H 35/0013; C09J 5/00
See application file for complete search history.

(56) References Cited

U.S. PATENT DOCUMENTS

2023/0159296 A1 5/2023 Takashima et al.

FOREIGN PATENT DOCUMENTS

| | | | | |
|---|---|---|---|---|
| CN | 112644824 A * | 4/2021 | | ............. H10P 54/00 |
| JP | S60-44463 A | 3/1985 | | |
| JP | H3-119083 A | 5/1991 | | |
| JP | H7-161295 A | 6/1995 | | |
| JP | 2008-235685 A | 10/2008 | | |

(Continued)

OTHER PUBLICATIONS

Machine Translation of CN112644824A (Year: 2021).*
(Continued)

*Primary Examiner* — Daniel Mcnally
(74) *Attorney, Agent, or Firm* — Hauptman Ham, LLP

(57) ABSTRACT

To stably ensure an extra length of a threadlike adhesive. A threadlike adhesive sticking apparatus includes: a chuck unit disposed upstream of a nozzle, configured to guide a threadlike adhesive to the nozzle, and configured to chuck the threadlike adhesive; and a moving unit configured to move the chuck unit, in a state of chucking the threadlike adhesive, to be farther away from the nozzle.

14 Claims, 8 Drawing Sheets

(56) References Cited

FOREIGN PATENT DOCUMENTS

| | | | | |
|---|---|---|---|---|
| JP | 2009-283742 A | 12/2009 | | |
| JP | 2016-74538 A | 5/2016 | | |
| JP | 2021-161404 A | 10/2021 | | |
| WO | WO-2021200762 A1 * | 10/2021 | .............. | C09J 7/385 |

OTHER PUBLICATIONS

Machine Translation of WO2021200762A1 (Year: 2021).*

International Search Report issued for corresponding International Patent Application No. PCT/JP2023/035039 on Nov. 7, 2023, along with an English translation (5 pages).

Written Opinion issued for corresponding International Patent Application No. PCT/JP2023/035039 on Nov. 7, 2023 (3 pages).

* cited by examiner

THREADLIKE ADHESIVE STICKING APPARATUS AND THREADLIKE ADHESIVE STICKING METHOD

CROSS REFERENCE TO RELATED APPLICATION

This application is a National Stage of International Application No. PCT/JP2023/035039, filed on Sep. 26, 2023, which designates the United States and was published in Japan, and which is based upon and claims priority to Japanese Patent Application No. 2022-156912, filed on Sep. 29, 2022 in the Japan Patent Office. All of the aforementioned applications are hereby incorporated by reference in their entireties.

TECHNICAL FIELD

The present invention relates to a threadlike adhesive sticking apparatus and a threadlike adhesive sticking method.

BACKGROUND ART

An adhesive body such as an adhesive sheet or an adhesive tape is used for adhering various adherends such as a metal, glass, wood, paper, cardboard, and a plastic material. For example, in the case of a wound form such as a roll-shaped adhesive tape, in order to facilitate rewinding, a base material obtained by performing a peeling treatment on a rear surface with which an adhesive surface comes into contact is used.

As an adhesive tape sticking apparatus, there is an apparatus in which a roll-shaped adhesive tape pulled out from a tip end of a holder for storing the adhesive tape is pressed against an adherend by a roller provided at the tip end while the holder is moved to pull out and stick the adhesive tape to the adherend (see Patent Literatures 1 and 2). There is also an adhesive tape sticking apparatus in which an adhesive tape pulled out from a hole at a tip end of a holder for storing the adhesive tape is stuck to an adherend by using a peripheral wall surrounding the hole, and is stuck to the adherend (see Patent Literature 3). There is still a threadlike adhesive sticking apparatus that includes a nozzle having an inner wall surface for defining a tubular internal space and a tip end having a tip end opening at one end of the inner wall surface, the tip end opening communicating with the outside of the internal space, and in which a plurality of portions of a peripheral portion surrounding the tip end opening at the tip end function as a pressing unit for pressing, against an object, a threadlike adhesive that passes through the internal space and that is led out through the tip end opening to the outside (see Patent Literature 4).

CITATION LIST

Patent Literature

Patent Literature 1: JPS60-44463A
Patent Literature 2: JP2016-74538A
Patent Literature 3: JPH03-119083A
Patent Literature 4: JP2021-161404A

SUMMARY OF INVENTION

Technical Problem

However, since the sticking apparatuses described in Patent Literatures 1 and 2 press and stick the adhesive tape by using the roller, the adhesive tape may release from the roller or deviate within a width of the roller. Therefore, a sticking accuracy is not excellent and it is difficult to make small turns. When the adhesive tape is tried to be stuck in a curved shape, the adhesive tape may twist and cannot be stuck properly.

In the sticking apparatus described in Patent Literature 3, before the adhesive tape is fed out from a leading unit, an orientation of the adhesive tape is aligned by using a roller provided in the leading unit. That is, since the tip end portion that contributes to sticking is only one surface, which presses against a side without an adhesive layer of the base material of the adhesive tape, of the peripheral wall surrounding a rectangular hole, only a straight line can be drawn. The adhesive tape may deviate within a width of the rectangular hole.

In the sticking apparatus described in Patent Literature 4, a pressing roller capable of moving while being in contact with the threadlike adhesive is provided between the threadlike adhesive and the nozzle. When the threadlike adhesive is cut, the pressing roller presses the threadlike adhesive in a horizontal direction to move the cut tip end portion (lower end portion) of the threadlike adhesive upward, and an extra length at the start (start point) of the next sticking of the threadlike adhesive is reduced. However, according to this method, it is difficult to stabilize a return length for returning the extra length. This is because, since the pressing roller is directly connected to the nozzle, the threadlike adhesive is pulled up while being in contact with an upper end portion of the nozzle, and the threadlike adhesive is influenced by a play of an inner diameter of the nozzle and friction with the nozzle.

The present invention has been made in view of the above circumstances, and an object thereof is to provide a threadlike adhesive sticking apparatus and a threadlike adhesive sticking method capable of stably ensuring an extra length of a threadlike adhesive after cutting the threadlike adhesive.

Solution to Problem

A threadlike adhesive sticking apparatus according to the present invention includes: a chuck unit disposed upstream of a nozzle, configured to guide a threadlike adhesive to the nozzle, and configured to chuck the threadlike adhesive; and a first moving mechanism configured to move the chuck unit, in a state of chucking the threadlike adhesive, to be farther away from the nozzle.

In the threadlike adhesive sticking apparatus according to the present invention, for example, the chuck unit includes a first roller that guides the threadlike adhesive to the nozzle, and a second roller that chucks the threadlike adhesive between the first roller and the second roller, and the threadlike adhesive sticking apparatus further includes a second moving mechanism configured to move at least one of the first roller and the second roller to sandwich the threadlike adhesive.

In the threadlike adhesive sticking apparatus according to the present invention, for example, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the first moving mechanism is configured to move the chuck unit, in a state of chucking the threadlike adhesive, into a region defined by the virtual straight line in a range of the rotation angle θ of 90°≤θ≤270°.

The threadlike adhesive sticking apparatus according to the present invention further includes, for example, a contact unit disposed upstream of the nozzle and downstream of the chuck unit and configured to be in contact with at least one portion of the threadlike adhesive guided from the chuck unit to the nozzle.

In the threadlike adhesive sticking apparatus according to the present invention, for example, the contact unit includes a third roller, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the first moving mechanism is configured to move the chuck unit, in a state of chucking the threadlike adhesive, into a region defined by the virtual straight line in a range of the rotation angle θ of 90°≤θ≤180°.

In the threadlike adhesive sticking apparatus according to the present invention, for example, the contact unit includes a third roller and a fourth roller disposed to sandwich the threadlike adhesive guided from the chuck unit to the nozzle, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the first moving mechanism is configured to move the chuck unit, in a state of chucking the threadlike adhesive, into a region defined by the virtual straight line in a range of the rotation angle θ of 90°≤θ≤270°.

In the threadlike adhesive sticking apparatus according to the present invention, for example, the contact unit includes an annular member into which the threadlike adhesive guided from the chuck unit to the nozzle is insertable, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the first moving mechanism is configured to move the chuck unit, in a state of chucking the threadlike adhesive, into a region defined by the virtual straight line in a range of the rotation angle θ of 90°≤θ≤270°.

A threadlike adhesive sticking method according to the present invention, in a threadlike adhesive sticking apparatus including a chuck unit disposed upstream of a nozzle, configured to guide a threadlike adhesive to the nozzle, and configured to chuck the threadlike adhesive, includes: moving the chuck unit, in a state of chucking the threadlike adhesive, to be farther away from the nozzle.

In the threadlike adhesive sticking method according to the present invention, for example, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the chuck unit in a state of chucking the threadlike adhesive is moved into a region defined by the virtual straight line in a range of the rotation angle θ of 90°≤θ≤270°.

In the threadlike adhesive sticking method according to the present invention, for example, the threadlike adhesive sticking apparatus further includes a contact unit disposed upstream of the nozzle and downstream of the chuck unit and configured to be in contact with at least one portion of the threadlike adhesive guided from the chuck unit to the nozzle.

In the threadlike adhesive sticking method according to the present invention, for example, the contact unit includes a third roller, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the chuck unit in a state of chucking the threadlike adhesive is moved into a region defined by the virtual straight line in a range of the rotation angle θ of 90°≤θ≤180°.

In the threadlike adhesive sticking method according to the present invention, for example, the contact unit includes a third roller and a fourth roller disposed to sandwich the threadlike adhesive guided from the chuck unit to the nozzle, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the chuck unit in a state of chucking the threadlike adhesive is moved into a region defined by the virtual straight line in a range of the rotation angle θ of 90°≤θ≤270°.

In the threadlike adhesive sticking method according to the present invention, for example, the contact unit includes an annular member into which the threadlike adhesive guided from the chuck unit to the nozzle is insertable, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the chuck unit in a state of chucking the threadlike adhesive is moved into a region defined by the virtual straight line in a range of the rotation angle θ of 90°≤θ≤270°.

Advantageous Effects of Invention

According to the present invention, since the chuck unit in a state of chucking the threadlike adhesive is moved farther away from the nozzle, an extra length of the threadlike adhesive can be stably ensured.

BRIEF DESCRIPTION OF DRAWINGS

Each FIG. 4A, FIG. 4B, FIG. 4C.

Each FIG. 5A, FIG. 5B.

Each FIG. 6A, FIG. 6B, FIG. 6C.

Each FIG. 7A, FIG. 7B, FIG. 7C.

DESCRIPTION OF EMBODIMENTS

Hereinafter, preferred embodiments of a threadlike adhesive sticking apparatus and a threadlike adhesive sticking method according to the present invention will be described in detail with reference to the drawings.

First Embodiment

Figure 1:
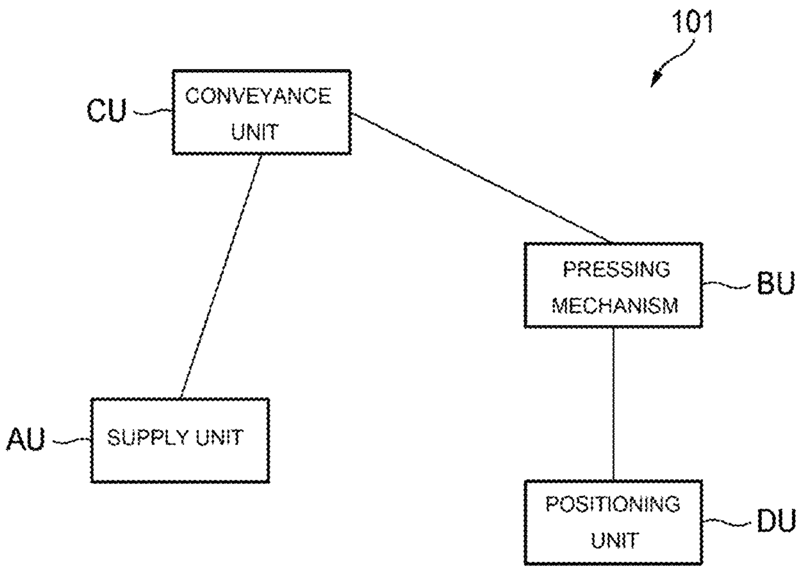
FIG. 1 is a diagram conceptually showing a configuration of a threadlike adhesive sticking apparatus according to the present invention.
Figure 2:
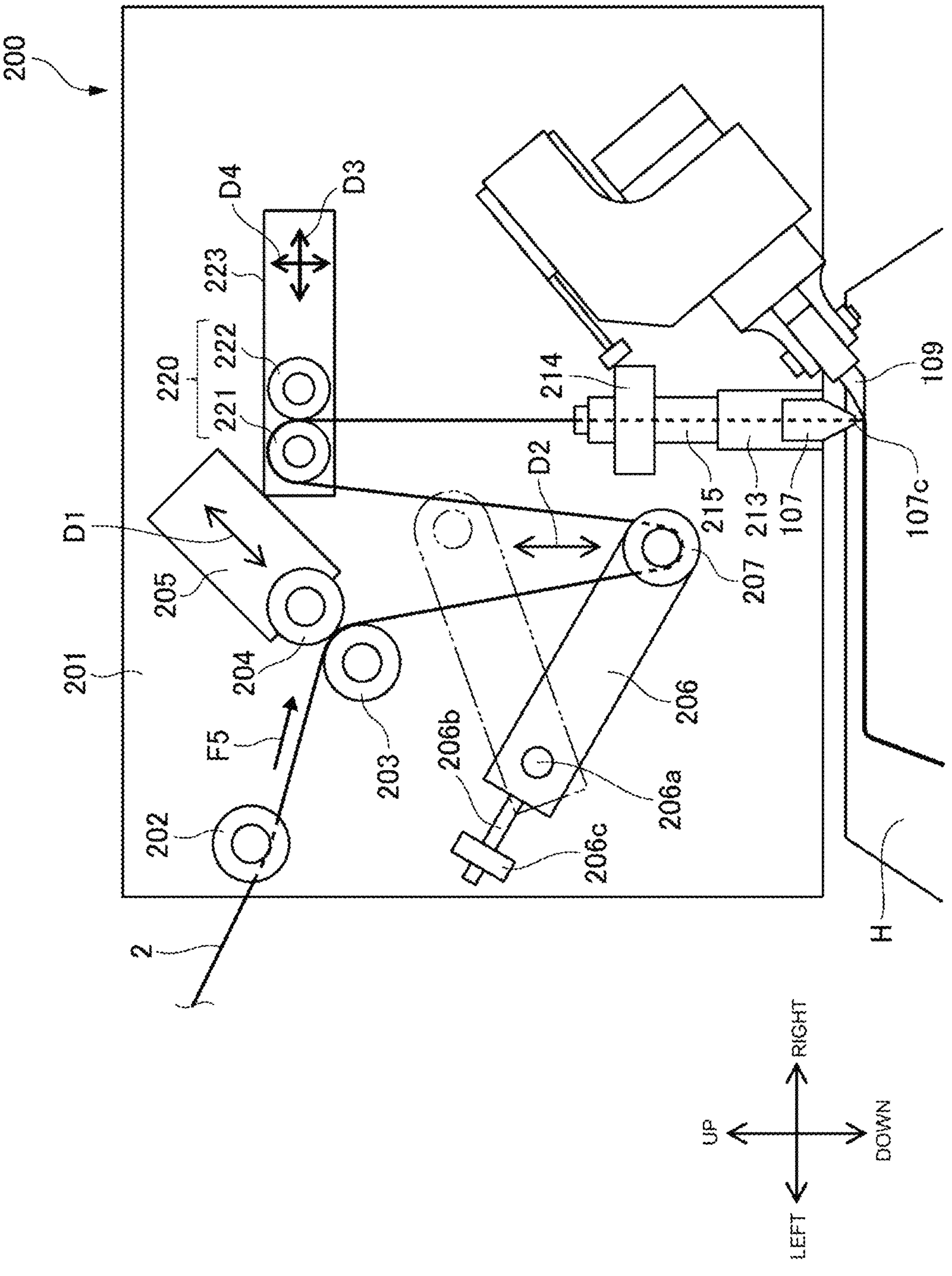
FIG. 2 is a schematic front view of a threadlike adhesive sticking apparatus according to a first embodiment.

FIG. 1 is a diagram conceptually showing a configuration of a threadlike adhesive sticking apparatus according to the present invention. FIG. 2 is a schematic front view of a threadlike adhesive sticking apparatus according to a first embodiment. Note that, arrows shown in and after FIG. 2 indicate front-rear, left-right, and up-down directions of the threadlike adhesive sticking apparatus. In addition, the front-rear direction is also referred to as an X-axis direction, the left-right direction (width direction) is also referred to as a Y-axis direction, and the up-down direction (height direction) is also referred to as a Z-axis direction.

A threadlike adhesive sticking apparatus 200 is an apparatus that presses and sticks a threadlike adhesive 2 to an object (adherend), and includes a supply unit AU, a pressing mechanism BU (nozzle), a conveyance unit CU, and a positioning unit DU, as shown in FIG. 1. The supply unit AU supplies the threadlike adhesive 2 wound in a roll shape. The pressing mechanism BU presses the supplied threadlike adhesive 2 against the adherend. The conveyance unit CU conveys the threadlike adhesive 2 from the supply unit AU to the pressing mechanism BU. The positioning unit DU positions the pressing mechanism BU with respect to the object.

(Positioning Unit DU)

The threadlike adhesive sticking apparatus 200 includes, as a part constituting an example of the positioning unit DU, a table (not shown) disposed on a base and a stage (not shown) slidable along the X-axis direction (front-rear direction) on the table. The object is placed on an upper surface of the stage and mounted by suction or the like. When the stage is moved in the X-axis direction by a driving unit, the object is moved in the X-axis direction. In addition, the threadlike adhesive sticking apparatus 200 includes, for example, a pair of support columns (not shown) erected on left and right sides of the table, and a horizontal arm (not shown) installed between the pair of support columns along the Y-axis direction (left-right direction) above the pair of support columns.

To the horizontal arm, a horizontal movement unit (not shown) slidable along the Y-axis direction is attached. The horizontal movement unit is moved in the Y-axis direction by a driving unit (not shown). A lifting body (not shown) is held by the horizontal movement unit so as to be slidable in the Z-axis direction (up-down direction). A nozzle 107 (see FIG. 2) is attached to the lifting body via an attachment plate or the like. That is, in the horizontal movement unit, the nozzle 107 is moved in the Z-axis direction by a driving unit (not shown). Details of the nozzle 107 will be described later.

The threadlike adhesive sticking apparatus 200 can relatively position the nozzle 107 with respect to the object in an XY plane by the stage and the horizontal movement unit, and can move the nozzle 107 in the Z-axis direction by lifting and lowering the lifting body of the horizontal movement unit. That is, the stage and the horizontal movement unit function as the positioning unit DU.

(Supply Unit AU)

The threadlike adhesive sticking apparatus 200 includes a winding body and a winding body holding unit as an example of the supply unit AU. The winding body has a cylindrical shape such as a reel, a paper tube, and a bobbin. The threadlike adhesive 2 obtained by attaching an adhesive to a threadlike core material is wound around an outer peripheral surface of the winding body. The winding body can be formed of a metal, a resin, an easily peelable material, or the like. The winding body holding unit holds the winding body such that movement of the winding body in the front-rear direction is restricted in the vicinity of both ends of the winding body around which the threadlike adhesive 2 is wound, and the winding body is rotatable as the threadlike adhesive 2 is conveyed (fed out). The threadlike adhesive 2 is an adhesive body obtained by covering a surface of a threadlike core material with an adhesive layer. Details of the threadlike adhesive 2 will be described later.

The threadlike adhesive sticking apparatus 200 can supply the threadlike adhesive 2 wound in a roll shape by using the winding body and the winding body holding unit. That is, the winding body and the winding body holding unit function as the supply unit AU.

(Conveyance Unit CU)

In the threadlike adhesive sticking apparatus 200, the pressing mechanism BU and a main part of the conveyance unit CU are attached to a front surface of the attachment plate 201 having a substantially rectangular shape, and are positioned by the positioning unit DU.

The threadlike adhesive sticking apparatus 200 includes rollers 202, 203, and 204, a moving unit 205, an arm 206, rollers 207, 221, and 222, and a moving unit 223 as an example of the conveyance unit CU, and conveys the threadlike adhesive 2 fed out from the supply unit AU (winding body) to the nozzle 107.

The rollers 202, 203, 204, 207, 221, and 222 are rotatably attached to the attachment plate 201 directly or indirectly in a vertical plane (YZ plane). As an example, the rollers 202, 203, 204, 207, 221, and 222 are disposed such that respective rotation positions thereof are substantially the same distance from a front surface side of the attachment plate 201 (the front side of the paper in FIG. 2).

The roller 202 is attached to an upper left corner of the attachment plate 201, and guides the threadlike adhesive 2 to the rollers 203 and 204. On a left side of the roller 202, a roller (not shown) movable up and down according to a tension of the threadlike adhesive 2 to be conveyed and a roller (not shown) provided above a right side of this roller may be disposed. With these rollers, the tension of the threadlike adhesive 2 supplied to the roller 202 can be adjusted to be constant.

The roller 203 is attached to the attachment plate 201 slightly below a right side of the roller 202. The roller 203 is a feeding roller driven by a motor (not shown) to rotate.

The roller 204 is disposed on the upper right of the roller 203, and is attached to a lower left end portion of the moving unit 205 such as an air cylinder that moves (slides) in a direction of an arrow D1 (upper right and lower left directions) with respect to the attachment plate 201. When positioned at the lowest left, the roller 204 is rotated in conjunction with the rotation of the roller 203, sandwiches the threadlike adhesive 2 with the roller 203, and pulls out the threadlike adhesive 2 in a direction of an arrow F5.

The arm 206 is a rod-shaped body extending in the left-right direction below the rollers 202 and 203 and the moving unit 205. The roller 207 is attached to a right end portion of the arm 206, and the vicinity of a left end portion of the arm 206 is rotatably supported on the attachment plate 201 by a rotation shaft 206*a*. A potentiometer for calculating a position of the roller 207 is attached to the rotation shaft 206*a*. The arm 206 is rotated in a direction of an arrow D2 (substantially in the up-down direction) by a drive unit such as a motor provided on a rear surface side of the attachment plate 201, for example. That is, the roller 207 is movable in the up-down direction by the rotation of the arm 206.

A shaft 206*b*, which extends along an extending direction of the arm 206 and is provided with a spiral ridge on an outer peripheral surface, protrudes from the left end portion of the arm 206. One or more weights 206*c* are attached to the shaft 206*b*. The weight 206*c* has a substantially disc shape, and a through hole provided at a center is formed with a groove to be screwed with the ridge of the shaft 206*b*. A distance between the weight 206*c* and the rotation shaft 206*a* (the left end portion of the arm 206) is changed by shifting the position of the weight 206*c* on the shaft 206*b*, so that the ease of movement of the arm 206 can be controlled.

The rollers 221 and 222 are attached to the upper right of the roller 207 and a right side of the roller 204 in the attachment plate 201. The rollers 221 and 222 guide the threadlike adhesive 2 pulled out by the rollers 203 and 204 and passing the roller 207 to the pressing mechanism BU (nozzle 107) provided directly below the rollers 221 and 222.

When the roller 207 is moved downward (displaced so as to lengthen a path from the rollers 203 and 204 to the roller 221), a conveying speed of the threadlike adhesive 2 decreases. In this way, the threadlike adhesive 2 is fed out by the rollers 203 and 204, and a rapid speed change of the fed-out threadlike adhesive 2 can be alleviated by the displacement of the roller 207. That is, the rollers 203, 204, 207, 221, and 222 and the arm 206 function as a feeding assist mechanism.

Further, the rollers 221 and 222 are attached to the moving unit 223 that moves in directions of arrows D3 and D4 (the left-right direction and the up-down direction) with respect to the attachment plate 201. The rollers 221 and 222 provided upstream of the nozzle 107 function as a chuck unit 220 that nips (chucks) the threadlike adhesive 2 after the sticking of the threadlike adhesive 2 is completed, the nozzle 107 is raised and the threadlike adhesive 2 is cut at a position close to an adherend H. Details of the chuck unit 220 will be described later (see FIG. 4A, FIG. 4B, FIG. 4C, and FIG. 4D).

(Pressing Mechanism BU)

Figure 3:
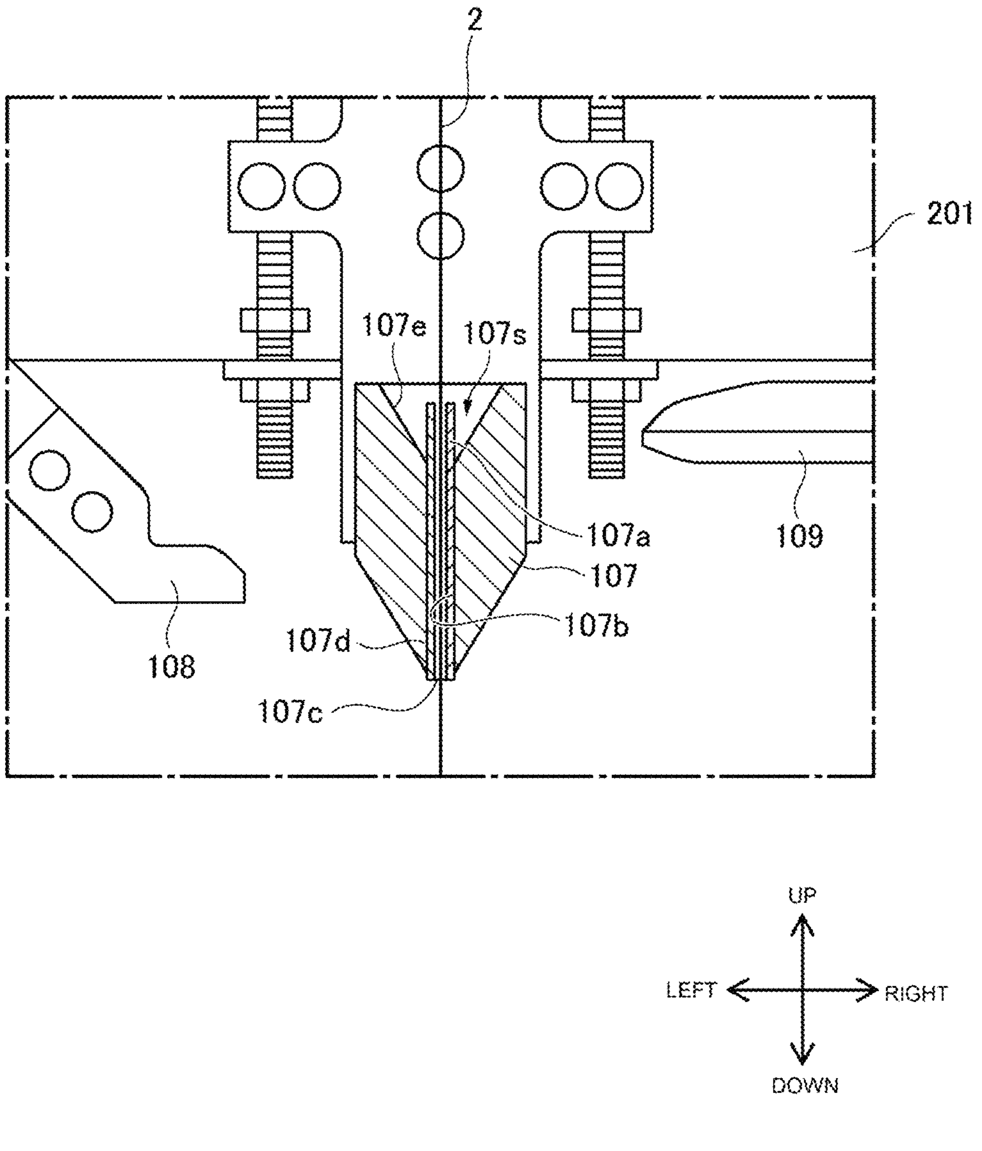
FIG. 3 is a view showing a cut surface of a nozzle.

With reference to FIGS. 2 and 3, an example of the pressing mechanism BU included in the threadlike adhesive sticking apparatus 200 will be described. FIG. 3 is a view showing a periphery of the nozzle 107 of the threadlike adhesive sticking apparatus 200, and is a view including a cross section of the nozzle 107 in the YZ plane along the threadlike adhesive 2.

As shown in FIG. 2, the threadlike adhesive sticking apparatus 200 includes, as an example of the pressing mechanism BU, the attachment plate 201, the nozzle 107, a slider 213, a fixing unit 214, and a spring 215. The nozzle 107 is fixed to a front surface of the slider 213, and a tip end opening 107*c* can protrude from a lower end of the attachment plate 201. The slider 213 is movable in the up-down direction with respect to the attachment plate 201 by a linear guide or the like. In the attachment plate 201, the fixing unit 214 is fixed above the slider 213. The spring 215 in which a shaft is inserted is held between the fixing unit 214 and an upper surface of the slider 213. In this way, the nozzle 107 according to the present embodiment is movable in the up-down direction, and includes an absorption mechanism that absorbs a displacement of the nozzle 107 with respect to a displacement of a base to which the nozzle 107 is attached in the up-down direction. The slider 213, the fixing unit 214, and the spring 215 constitute a moving mechanism that moves the nozzle 107. The attachment plate 201 is attached to the front surface side of the horizontal movement unit so as to be slidable in the Z-axis direction with respect to the horizontal movement unit. The nozzle 107, an air chuck 108, and an air scissor 109 are attached to the front surface side of the attachment plate 201.

When the sticking of the threadlike adhesive 2 is completed, the air chuck 108 and the air scissor 109 are moved by a driving unit from a normal position shown in FIG. 3. The air chuck 108 is moved diagonally lower right from the normal position, and chucks the threadlike adhesive 2 directly below the nozzle 107. The air scissor 109 is moved downward from the normal position and then moved leftward to cut the threadlike adhesive 2 chucked directly below the air chuck 108. The air chuck 108 and the air scissor 109 are attached to the lifting body of the horizontal movement unit via the attachment plate 201, similar to the nozzle 107, and can therefore move together with the nozzle 107 while maintaining a positional relationship with respect to the nozzle 107. Note that, the shape, the driving method, and the like of the air chuck 108 and the air scissor 109 are not limited as long as the threadlike adhesive 2 can be held and cut at a predetermined position. Instead of the air scissor 109, the threadlike adhesive 2 may be burned off by thermal cutting such as a heat cutter.

The nozzle 107 is a member made of aluminum or the like having a shape in which a bottom surface of a cone is connected to a lower surface of a cube. The nozzle 107 has an inner wall surface 107*b* for defining a tubular internal space 107*s* extending in the up-down direction, and a tip end 107*d* having the tip end opening 107*c* communicating with the outside of the tubular internal space 107*s* at a lower end portion of the inner wall surface 107*b*. The nozzle 107 is a member made of a metal or the like, and a surface of the nozzle 107 including the inner wall surface 107*b* and the tip end 107*d* is subjected to a slidability improving process. In addition, the nozzle 107 has an insertion side opening 107*e* in which the tubular internal space 107*s* communicates with the outside at an upper end portion of the inner wall surface 107*b*. The inner wall surface 107*b* is formed such that the tubular internal space 107*s* has a funnel shape in which a cylinder having a diameter same as the tip end opening 107*c* extends upward from the tip end opening 107*c* and gradually increases in diameter. The insertion side opening 107*e* has a funnel shape larger in diameter than the tip end opening 107*c*. Note that, the inner wall surface 107*b* may define a tubular internal space, and for example, an upper portion may not have a funnel shape but may have a cylindrical shape having the same diameter.

In addition, a hollow cylindrical tube 107*a* made of a non-adhesive resin such as polytetrafluoroethylene (PTFE) may be provided in the tubular internal space 107*s* of the nozzle 107, the tube 107*a* extending from an upper end to a lower end (tip end 107*d*) of the nozzle 107. Alternatively, a surface treatment for improving slidability may be performed. A diameter of a lower opening of the tube 107*a* is preferably about 1 mm, for example, and a diameter of the threadlike adhesive 2 is preferably 0.45 mm, for example. That is, a cross-sectional area of the lower opening of the tube 107*a* is preferably about 4.9 times a cross-sectional area of the threadlike adhesive 2. The tube 107*a* protrudes slightly (for example, about 0.5 mm to 1 mm) from a lower end of the inner wall surface 107*b*. When the threadlike adhesive 2 is inserted into the tube 107*a*, the slidability (feeding property) of the threadlike adhesive 2 is improved. In addition, since the insertion side opening 107*e* is enlarged in diameter, it is easy to insert the threadlike adhesive 2 into the nozzle 107. Note that, when a non-adhesive resin such as PTFE is used as the material of the nozzle 107 itself, it is possible to prevent the threadlike adhesive 2 from adhering to the nozzle 107. Accordingly, the threadlike adhesive 2 is not caught from the nozzle 107 and can be fed out with good slidability, so that the tube 107*a* is unnecessary. The shape of the nozzle 107 is not limited as long as the nozzle 107 has a tubular internal space and the internal space has a tip end having a tip end opening communicating with the outside. In addition, in the nozzle 107, the shape of the tip end opening 107*c* (or the lower opening of the tube 107*a*) is preferably a circle or a polygon having a pentagon or more.

The nozzle 107 presses, against the object, the threadlike adhesive 2 led out to the outside from the lower opening (tip end opening 107*c*) of the tube 107*a* through the tube 107*a* (tubular internal space 107*s*). More specifically, in a lower end portion of the tube 107*a* that is a peripheral portion surrounding the tip end opening 107*c* of the nozzle 107, the entire periphery or any plurality of portions function as a pressing unit that presses the threadlike adhesive 2 against the object. Therefore, it is possible to stick the threadlike adhesive 2 while moving the nozzle 107 in a plurality of optional directions without using a roller or the like as the pressing unit. Therefore, it is possible to prevent a problem that a sticking accuracy is poor due to the movement of the adhesive within a width of a roller, and the adhesive is detached from the roller depending on a sticking path in a case where the adhesive is pressed by the roller, and thus it is possible to accurately stick the threadlike adhesive.

(Chuck Unit)

Each FIG. 4A, FIG. 4B, FIG. 4C, and FIG. 4D is a schematic view showing a periphery of the chuck unit 220 of the threadlike adhesive sticking apparatus 200 according to the first embodiment. As described above, the rollers 221 and 222 are provided upstream of the nozzle 107 and guide the threadlike adhesive 2 to the nozzle 107. The rollers 221 and 222 function as the chuck unit 220 that can chuck the threadlike adhesive 2 after the sticking of the threadlike adhesive 2 is completed, the nozzle 107 is raised and the threadlike adhesive 2 is cut at a position close to the adherend H.

That is, the chuck unit 220 includes the roller 221 as a first roller that guides the threadlike adhesive 2 to the nozzle 107, and the roller 222 as a second roller that chucks the threadlike adhesive 2 between the roller 221 and the roller 222.

Figure 4A:
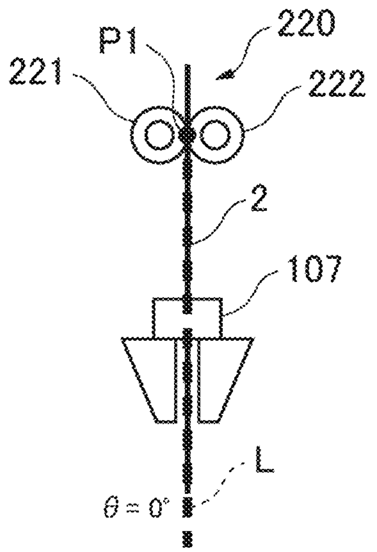
FIG. 4D is a schematic view showing a periphery of a chuck unit of the threadlike adhesive sticking apparatus according to the first embodiment.

FIG. 4A shows a position at an initial state of the chuck unit 220 immediately after the threadlike adhesive 2 is cut. As shown in FIG. 2, the chuck unit 220 is positioned vertically above the nozzle 107, and the threadlike adhesive 2 is in a linear state from upstream of the chuck unit 220 toward the nozzle 107.

The moving unit 223 shown in FIG. 2 constitutes a first moving mechanism that moves the chuck unit 220, in a state of chucking the threadlike adhesive 2, to be farther away from the nozzle 107. That is, as indicated by arrows A1 to A3 in FIG. 4B, FIG. 4C, and FIG. 4D, the moving unit 223 as the first moving mechanism moves the chuck unit 220 in the initial state indicated by a broken line to be farther away from the nozzle 107.

The moving unit 223 also functions as a second moving mechanism that moves at least one of the roller 221 and the roller 222 to sandwich the threadlike adhesive 2.

A specific operation performed by the moving unit 223 as the first moving mechanism will be described. For the sake of description, in a state where the chuck unit 220 chucks the threadlike adhesive 2, a virtual straight line L extending from a chuck position P1 at which the chuck unit 220 chucks the threadlike adhesive 2 toward the nozzle 107 is defined.

In addition, a rotation angle in the case where the virtual straight line L is rotated counterclockwise about the chuck position P1 as a rotation center is defined as a rotation angle θ. θ=0° serving as a reference of the rotation angle θ is the rotation angle θ of the virtual straight line L along a direction in which the threadlike adhesive 2 chucked by the chuck unit 220 is fed out from the nozzle 107, that is, a feeding direction of the threadlike adhesive 2 from the nozzle 107, as shown in FIG. 4A.

Figure 4B:
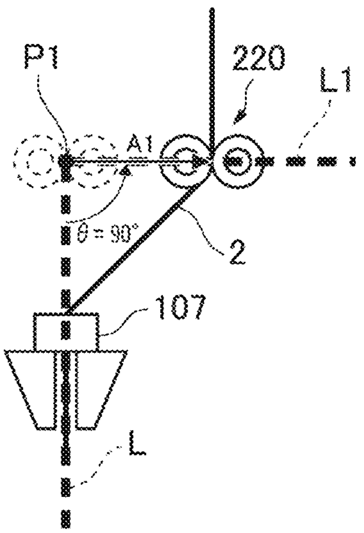

FIG. 4B shows an example of the movement of the chuck unit 220 by the moving unit 223. The moving unit 223 moves the chuck unit 220 in the state of chucking the threadlike adhesive 2 to a virtual straight line L1 obtained by rotating the virtual straight line L counterclockwise at a rotation angle θ=90°. That is, the moving unit 223 moves the chuck unit 220 along the arrow A1. The moving unit 223 can move the chuck unit 220 not only at the shown position but also at a position closer to or farther from the nozzle 107 on the virtual straight line L1.

Figure 4C:
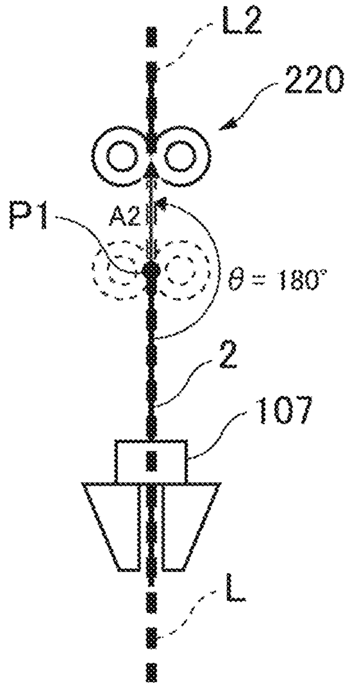

FIG. 4C shows an example of the movement of the chuck unit 220 by the moving unit 223. The moving unit 223 moves the chuck unit 220 in the state of chucking the threadlike adhesive 2 to a virtual straight line L2 obtained by rotating the virtual straight line L counterclockwise at a rotation angle θ=180°. That is, the moving unit 223 moves the chuck unit 220 along the arrow A2. The moving unit 223 can move the chuck unit 220 not only at the shown position but also at a position closer to or farther from the nozzle 107 on the virtual straight line L2.

Figure 4D:
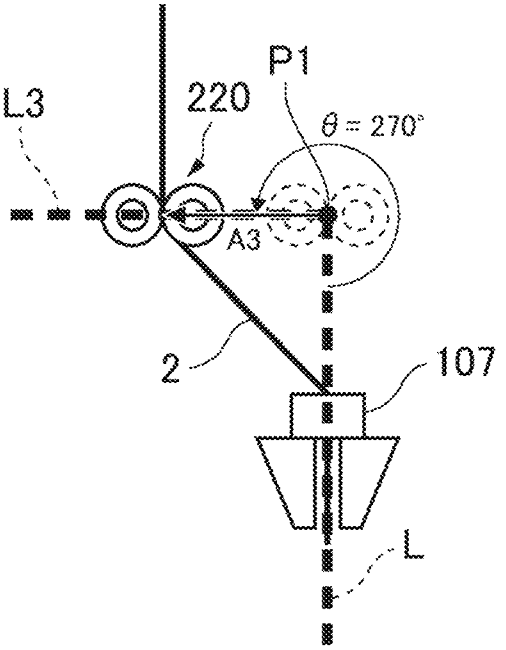

FIG. 4D shows an example of the movement of the chuck unit 220 by the moving unit 223. The moving unit 223 moves the chuck unit 220 in the state of chucking the threadlike adhesive 2 to a virtual straight line L3 obtained by rotating the virtual straight line L counterclockwise at a rotation angle θ=270°. That is, the moving unit 223 moves the chuck unit 220 along the arrow A2. The moving unit 223 can move the chuck unit 220 not only at the shown position but also at a position closer to or farther from the nozzle 107 on the virtual straight line L3.

To sum up FIG. 4B, FIG. 4C, and FIG. 4D, the moving unit 223 can move the chuck unit 220, in the state of chucking the threadlike adhesive 2, into a region defined by the virtual straight lines L1 to L3 in a range of the rotation angle θ of 90°≤θ≤270°. Therefore, the moving unit 223 can also move the chuck unit 220 to the position (not shown) at the rotation angle θ (θ=120°, 150°, 210°, 240°, or the like) with respect to the virtual straight line L.

As described above, the moving unit 223 as the first moving mechanism can pull up and rewind the threadlike adhesive 2 chucked by the chuck unit 220 to the upstream side by moving the chuck unit 220 in the state of chucking the threadlike adhesive 2 to be farther away from the nozzle 107. Therefore, by controlling the movement by the moving unit 223, the extra length of the threadlike adhesive 2 can be directly controlled, and the extra length can be stabilized. When the extra length is stabilized, the extra length at the start of the next sticking is in a constant state, so that a sticking accuracy at the next sticking can be improved.

The chuck unit 220 includes the roller 221 as a first roller and the roller 222 as a second roller. Therefore, the chuck unit 220 can chuck the threadlike adhesive 2 with a simple configuration.

The moving unit 223 also functions as a second moving mechanism that moves at least one of the roller 221 and the roller 222 to sandwich the threadlike adhesive 2. The moving unit 223 serves as both the first moving mechanism that moves the chuck unit 220 and the second moving mechanism that activates a chuck function of the chuck unit 220. Therefore, the threadlike adhesive sticking apparatus 200 can achieve both the chuck and the pull-up of the threadlike adhesive 2 with a simple configuration while preventing an increase in components such as an air cylinder for moving the roller.

In particular, the moving unit 223 moves the chuck unit 220, in the state of chucking the threadlike adhesive 2, into the region defined by the virtual straight lines L1 to L3 in the range of the rotation angle θ of 90°≤θ≤270°. In the case where the rotation angle θ is θ<90° or θ>270°, there is a risk that the threadlike adhesive 2 comes into contact with an upper portion of the nozzle 107, a main body of the nozzle 107, or the like to deform the threadlike adhesive 2, and the threadlike adhesive 2 may be bent. Therefore, by defining a movement range of the moving unit 223 by the chuck unit 220 using a virtual straight line as in the embodiment, it is possible to prevent such problems.

Second Embodiment

Each FIG. 5A, FIG. 5B, FIG. 5C, and FIG. 5D is a schematic view showing a periphery of the chuck unit 220 of the threadlike adhesive sticking apparatus 200 according to a second embodiment. Unlike the first embodiment, the threadlike adhesive sticking apparatus 200 according to the present embodiment includes a third roller 224 as a contact unit disposed upstream of the nozzle 107 and downstream of the chuck unit 220 and configured to be in contact with at least one portion of the threadlike adhesive 2 guided from the chuck unit 220 to the nozzle 107.

Figure 5A:
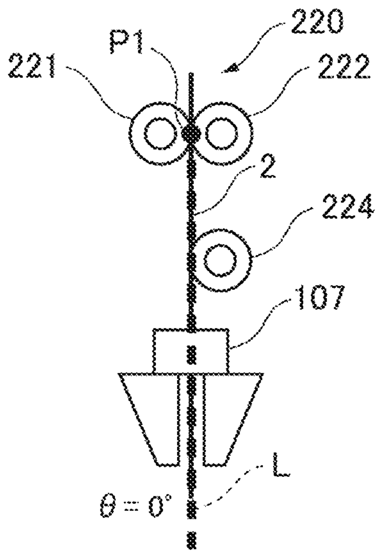
FIG. 5C is a schematic view showing a periphery of a chuck unit of a threadlike adhesive sticking apparatus according to a second embodiment.

FIG. 5A shows a position at an initial state of the chuck unit 220 immediately after the threadlike adhesive 2 is cut. As shown in FIG. 2, the chuck unit 220 is positioned vertically above the nozzle 107, and the threadlike adhesive 2 is in a linear state from upstream of the chuck unit 220 toward the nozzle 107.

The moving unit 223 shown in FIG. 2 constitutes a first moving mechanism that moves the chuck unit 220, in a state of chucking the threadlike adhesive 2, to be farther away from the nozzle 107. That is, as indicated by the arrows A1 and A2 in FIG. 5B and FIG. 5C, the moving unit 223 as the first moving mechanism moves the chuck unit 220 in the initial state indicated by a broken line to be farther away from the nozzle 107.

A specific operation performed by the moving unit 223 as the first moving mechanism will be described. Similar to the first embodiment, the virtual straight line L extending from the chuck position P1 toward the nozzle 107 and the rotation angle θ are defined, and θ=0° is defined in the state of FIG. 5A.

Figure 5B:
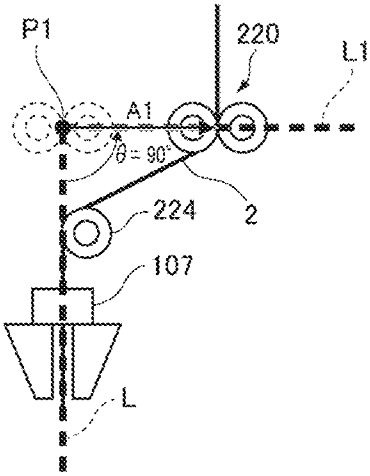

FIG. 5B shows an example of the movement of the chuck unit 220 by the moving unit 223. The moving unit 223 moves the chuck unit 220 in the state of chucking the threadlike adhesive 2 to the virtual straight line L1 obtained by rotating the virtual straight line L counterclockwise at a rotation angle θ=90°. That is, the moving unit 223 moves the chuck unit 220 along the arrow A1. At this time, unlike the first embodiment, the third roller 224 comes into contact with one portion of the threadlike adhesive 2, and the threadlike adhesive 2 is pulled up while being in contact with the third roller 224.

Figure 5C:
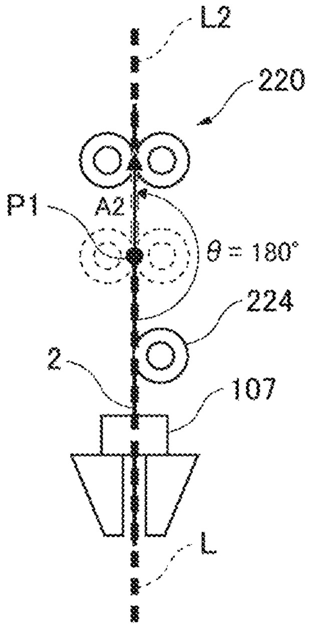

FIG. 5C shows an example of the movement of the chuck unit 220 by the moving unit 223. The moving unit 223 moves the chuck unit 220 in the state of chucking the threadlike adhesive 2 to the virtual straight line L2 obtained by rotating the virtual straight line L counterclockwise at a rotation angle θ=180°. That is, the moving unit 223 moves the chuck unit 220 along the arrow A2. A contact state between the third roller 224 and the threadlike adhesive 2 does not change.

To sum up FIG. 5B and FIG. 5C, the moving unit 223 can move the chuck unit 220, in the state of chucking the threadlike adhesive 2, into a region defined by the virtual straight lines L1 and L2 in a range of the rotation angle θ of 90°≤θ≤180°. Therefore, the moving unit 223 can also move the chuck unit 220 to the position (not shown) at the rotation angle θ (θ=120°, 150°, or the like) with respect to the virtual straight line L.

As described above, the moving unit 223 as the first moving mechanism can pull up and rewind the threadlike adhesive 2 chucked by the chuck unit 220 to the upstream side by moving the chuck unit 220 in the state of chucking the threadlike adhesive 2 to be farther away from the nozzle 107. Therefore, by controlling the movement by the moving unit 223, an extra length of the threadlike adhesive 2 can be directly controlled, and the extra length can be stabilized. When the extra length is stabilized, the extra length at the start of the next sticking is in a constant state, so that a sticking accuracy at the next sticking can be improved.

In particular, the moving unit 223 moves the chuck unit 220, in the state of chucking the threadlike adhesive 2, into the region defined by the virtual straight lines L1 and L2 in the range of the rotation angle θ of 90°≤θ≤180°. In the case where the rotation angle θ is θ<90° or θ>180°, there is a risk that the threadlike adhesive 2 comes into contact with an upper portion of the nozzle 107, a main body of the nozzle 107, or the like to deform the threadlike adhesive 2, and the threadlike adhesive 2 may be bent. Therefore, by defining a movement range of the moving unit 223 by the chuck unit 220 using a virtual straight line as in the embodiment, it is possible to prevent such problems.

In the shown example, the contact unit in contact with at least one portion of the threadlike adhesive 2 is constituted by the third roller 224, but the contact unit may be constituted by a contact jig other than the roller. The other contact jig may be, for example, a member made of a material having high slidability and having a shape in which a contact area with the threadlike adhesive 2 is reduced. The material may be polytetrafluoroethylene (PTFE), polyethylene (PTFE), polypropylene (PP), or the like. The shape may be a cylindrical object having a small diameter, a plate-shaped member having a curved tip end portion, or the like. Even with such a contact jig, the extra length can be stabilized.

Third Embodiment

Each FIG. 6A, FIG. 6B, FIG. 6C, and FIG. 6D is a schematic view showing a periphery of the chuck unit 220 of the threadlike adhesive sticking apparatus 200 according to a third embodiment. Unlike the second embodiment, in the threadlike adhesive sticking apparatus 200 according to the present embodiment, a contact unit disposed upstream of the nozzle 107 and downstream of the chuck unit 220 includes a fourth roller 225 in addition to the third roller 224. The third roller 224 and the fourth roller 225 are disposed to sandwich the threadlike adhesive 2 guided from the chuck unit 220 to the nozzle 107.

Figure 6A:
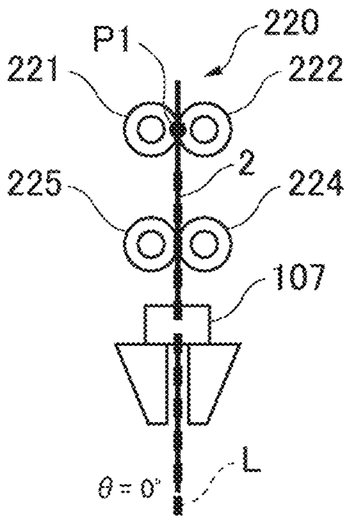
FIG. 6D is a schematic view showing a periphery of a chuck unit of a threadlike adhesive sticking apparatus according to a third embodiment.

FIG. 6A shows a position at an initial state of the chuck unit 220 immediately after the threadlike adhesive 2 is cut. As shown in FIG. 2, the chuck unit 220 is positioned vertically above the nozzle 107, and the threadlike adhesive 2 is in a linear state from upstream of the chuck unit 220 toward the nozzle 107.

The moving unit 223 shown in FIG. 2 constitutes a first moving mechanism that moves the chuck unit 220, in a state of chucking the threadlike adhesive 2, to be farther away from the nozzle 107. That is, as indicated by the arrows A1 to A3 in FIG. 6B, FIG. 6C, and FIG. 6D, the moving unit 223 as the first moving mechanism moves the chuck unit 220 in the initial state indicated by a broken line to be farther away from the nozzle 107.

A specific operation performed by the moving unit 223 as the first moving mechanism will be described. Similar to the first embodiment, the virtual straight line L extending from the chuck position P1 toward the nozzle 107 and the rotation angle θ are defined, and θ=0° is defined in the state of FIG. 6A.

Figure 6B:
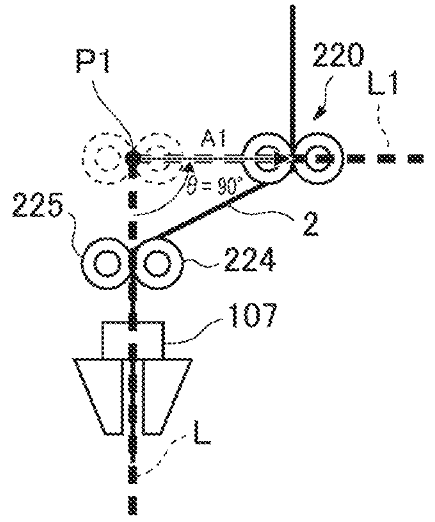

FIG. 6B shows an example of the movement of the chuck unit 220 by the moving unit 223. The moving unit 223 moves the chuck unit 220 in the state of chucking the threadlike adhesive 2 to the virtual straight line L1 obtained by rotating the virtual straight line L counterclockwise at a rotation angle θ=90°. That is, the moving unit 223 moves the chuck unit 220 along the arrow A1. At this time, unlike the first embodiment, the third roller 224 and the fourth roller 225 come into contact with the threadlike adhesive 2, and the threadlike adhesive 2 is pulled up while being in contact with the third roller 224 and the fourth roller 225.

Figure 6C:
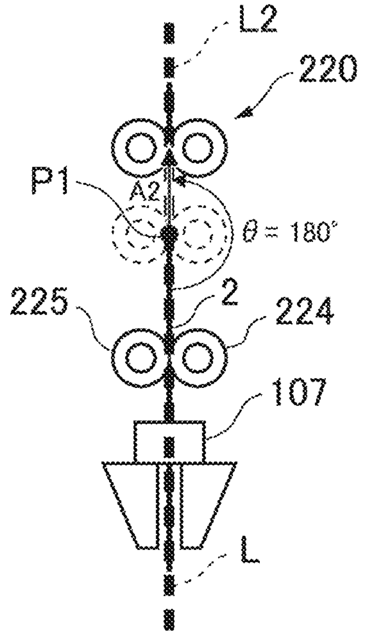

FIG. 6C shows an example of the movement of the chuck unit 220 by the moving unit 223. The moving unit 223 moves the chuck unit 220 in the state of chucking the threadlike adhesive 2 to the virtual straight line L2 obtained by rotating the virtual straight line L counterclockwise at a rotation angle θ=180°. That is, the moving unit 223 moves the chuck unit 220 along the arrow A2. A contact state between the third roller 224 and the fourth roller 225 with the threadlike adhesive 2 does not change.

Figure 6D:
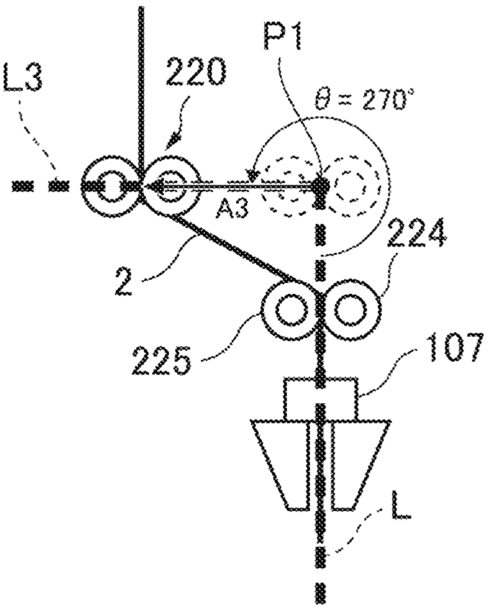

FIG. 6D shows an example of the movement of the chuck unit 220 by the moving unit 223. The moving unit 223 moves the chuck unit 220 in the state of chucking the threadlike adhesive 2 to the virtual straight line L3 obtained by rotating the virtual straight line L counterclockwise at a rotation angle θ=270°. That is, the moving unit 223 moves the chuck unit 220 along the arrow A2. At this time, unlike the first embodiment, the third roller 224 and the fourth roller 225 come into contact with the threadlike adhesive 2, and the threadlike adhesive 2 is pulled up while being in contact with the third roller 224 and the fourth roller 225.

To sum up FIG. 6B, FIG. 6C, and FIG. 6D, the moving unit 223 can move the chuck unit 220, in the state of chucking the threadlike adhesive 2, into a region defined by the virtual straight lines L1 to L3 in a range of the rotation angle θ of 90°≤θ≤270°. Therefore, the moving unit 223 can also move the chuck unit 220 to the position (not shown) at the rotation angle θ (θ=120°, 150°, 210°, 240°, or the like) with respect to the virtual straight line L.

As described above, the moving unit 223 as the first moving mechanism can pull up and rewind the threadlike adhesive 2 chucked by the chuck unit 220 to the upstream side by moving the chuck unit 220 in the state of chucking the threadlike adhesive 2 to be farther away from the nozzle 107. Therefore, by controlling the movement by the moving unit 223, an extra length of the threadlike adhesive 2 can be directly controlled, and the extra length can be stabilized. When the extra length is stabilized, the extra length at the start of the next sticking is in a constant state, so that a sticking accuracy at the next sticking can be improved.

In particular, the moving unit 223 moves the chuck unit 220, in the state of chucking the threadlike adhesive 2, into the region defined by the virtual straight lines L1 to L3 in the range of the rotation angle θ of 90°≤θ≤270°. In the case where the rotation angle θ is θ<90° or θ>270°, there is a risk that the threadlike adhesive 2 comes into contact with an upper portion of the nozzle 107, a main body of the nozzle 107, or the like to deform the threadlike adhesive 2, and the threadlike adhesive 2 may be bent. Therefore, by defining a movement range of the moving unit 223 by the chuck unit 220 using a virtual straight line as in the embodiment, it is possible to prevent such problems.

In the shown example, the contact unit in contact with the threadlike adhesive 2 is constituted by the third roller 224 and the fourth roller 225, but the contact unit may be constituted by a contact jig other than the roller. The other contact jig may be, for example, a member made of a material having high slidability and having a shape in which a contact area with the threadlike adhesive 2 is reduced. The material may be polytetrafluoroethylene (PTFE), polyethylene (PTFE), polypropylene (PP), or the like. The shape may be a cylindrical object having a small diameter, a plate-shaped member having a curved tip end portion, or the like. Even with such a contact jig, the extra length can be stabilized.

Fourth Embodiment

Each FIG. FIG. 7A, FIG. 7B, FIG. 7C, and FIG. 7D is a schematic view showing a periphery of the chuck unit 220 of the threadlike adhesive sticking apparatus 200 according to a fourth embodiment. In the threadlike adhesive sticking apparatus 200 according to the present embodiment, a contact unit includes an annular member 226 into which the threadlike adhesive 2 is insertable, instead of the third roller

224 and the fourth roller 225 in the third embodiment. The annular member 226 is a ring-shaped member, and is attached to the attachment plate 201 via a predetermined jig, for example.

Figure 7A:
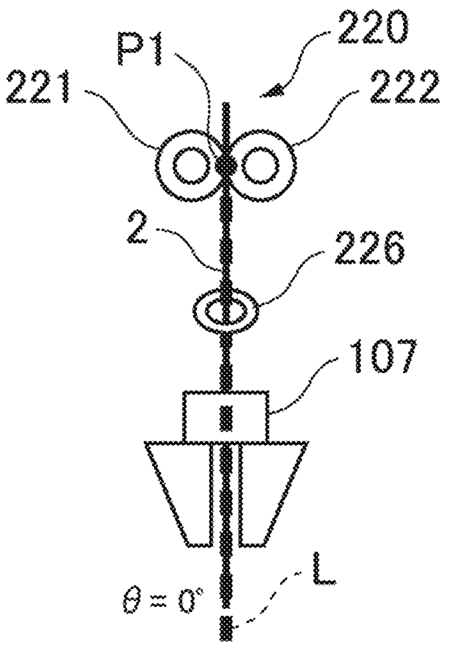
FIG. 7D is a schematic view showing a periphery of a chuck unit of a threadlike adhesive sticking apparatus according to a fourth embodiment.

FIG. 7A shows a position at an initial state of the chuck unit 220 immediately after the threadlike adhesive 2 is cut. As shown in FIG. 2, the chuck unit 220 is positioned vertically above the nozzle 107, and the threadlike adhesive 2 is in a linear state from upstream of the chuck unit 220 toward the nozzle 107.

The moving unit 223 shown in FIG. 2 constitutes a first moving mechanism that moves the chuck unit 220, in a state of chucking the threadlike adhesive 2, to be farther away from the nozzle 107. That is, as indicated by the arrows A1 to A3 in FIG. 7B, FIG. 7C, and FIG. 7D, the moving unit 223 as the first moving mechanism moves the chuck unit 220 in the initial state indicated by a broken line to be farther away from the nozzle 107.

A specific operation performed by the moving unit 223 as the first moving mechanism will be described. Similar to the first embodiment, the virtual straight line L extending from the chuck position P1 toward the nozzle 107 and the rotation angle θ are defined, and θ=0° is defined in the state of FIG. 7A.

Figure 7B:
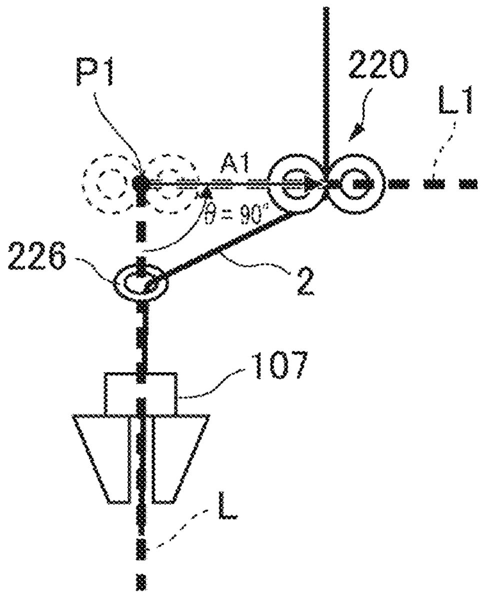

FIG. 7B shows an example of the movement of the chuck unit 220 by the moving unit 223. The moving unit 223 moves the chuck unit 220 in the state of chucking the threadlike adhesive 2 to the virtual straight line L1 obtained by rotating the virtual straight line L counterclockwise at a rotation angle θ=90°. That is, the moving unit 223 moves the chuck unit 220 along the arrow A1. At this time, unlike the first embodiment, the threadlike adhesive 2 is inserted through the annular member 226 and pulled up while being restrained in an internal space of the annular member 226.

Figure 7C:
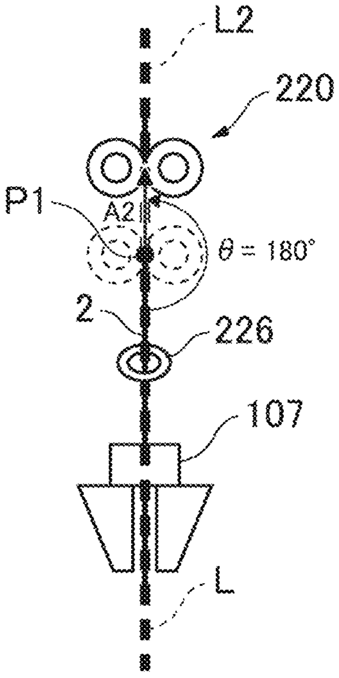

FIG. 7C shows an example of the movement of the chuck unit 220 by the moving unit 223. The moving unit 223 moves the chuck unit 220 in the state of chucking the threadlike adhesive 2 to the virtual straight line L2 obtained by rotating the virtual straight line L counterclockwise at a rotation angle θ=180°. That is, the moving unit 223 moves the chuck unit 220 along the arrow A2. A relative state between the annular member 226 and the threadlike adhesive 2 does not change.

Figure 7D:
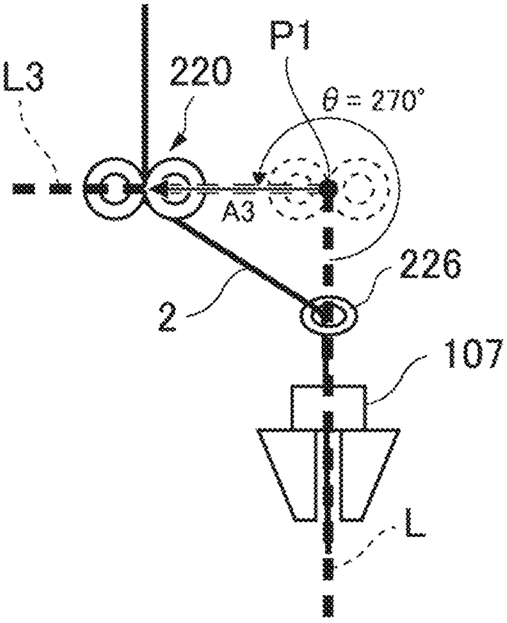

FIG. 7D shows an example of the movement of the chuck unit 220 by the moving unit 223. The moving unit 223 moves the chuck unit 220 in the state of chucking the threadlike adhesive 2 to the virtual straight line L3 obtained by rotating the virtual straight line L counterclockwise at a rotation angle θ=270°. That is, the moving unit 223 moves the chuck unit 220 along the arrow A2. At this time, unlike the first embodiment, the threadlike adhesive 2 is inserted through the annular member 226 and pulled up while being restrained in the internal space of the annular member 226.

To sum up FIG. 7B, FIG. 7C, and FIG. 7D, the moving unit 223 can move the chuck unit 220, in the state of chucking the threadlike adhesive 2, into a region defined by the virtual straight lines L1 to L3 in a range of the rotation angle θ of 90°≤θ≤270°. Therefore, the moving unit 223 can also move the chuck unit 220 to the position (not shown) at the rotation angle θ (θ=120°, 150°, 210°, 240°, or the like) with respect to the virtual straight line L.

As described above, the moving unit 223 as the first moving mechanism can pull up and rewind the threadlike adhesive 2 chucked by the chuck unit 220 to the upstream side by moving the chuck unit 220 in the state of chucking the threadlike adhesive 2 to be farther away from the nozzle 107. Therefore, by controlling the movement by the moving unit 223, an extra length of the threadlike adhesive 2 can be directly controlled, and the extra length can be stabilized. When the extra length is stabilized, the extra length at the start of the next sticking is in a constant state, so that a sticking accuracy at the next sticking can be improved.

In particular, the moving unit 223 moves the chuck unit 220, in the state of chucking the threadlike adhesive 2, into the region defined by the virtual straight lines L1 to L3 in the range of the rotation angle θ of 90°≤θ≤270°. In the case where the rotation angle θ is θ<90° or θ>270°, there is a risk that the threadlike adhesive 2 comes into contact with an upper portion of the nozzle 107, a main body of the nozzle 107, or the like to deform the threadlike adhesive 2, and the threadlike adhesive 2 may be bent. Therefore, by defining a movement range of the moving unit 223 by the chuck unit 220 using a virtual straight line as in the embodiment, it is possible to prevent such problems.

Note that, by adjusting the position, size, or the like of the annular member 226, it is possible to prevent the threadlike adhesive 2 from moving inside the annular member 226 and coming into contact with the inside of the nozzle 107.

In the shown example, the contact unit in contact with the threadlike adhesive 2 is constituted by the annular member 226, but the contact unit may be constituted by a contact jig other than the annular member. The other contact jig may be, for example, a member made of a material having high slidability and having a shape in which a contact area with the threadlike adhesive 2 is reduced. The material may be polytetrafluoroethylene (PTFE), polyethylene (PTFE), polypropylene (PP), or the like. The shape may be a cylindrical object having a small diameter, a plate-shaped member having a curved tip end portion, or the like. Even with such a contact jig, the extra length can be stabilized.

(Threadlike Adhesive)

The threadlike adhesive 2 includes, for example, a linear adhesive body including a linear core material and an adhesive layer that covers a surface of the core material in a longitudinal direction. The threadlike adhesive 2 is an elongated adhesive body and has a linear shape. The linear shape described here is a concept including not only a straight line shape, a curved line shape, a polygonal line shape, and the like, but also a state where a material can be bent in various directions and angles like a thread (threadlike shape). The adhesive layer in the present description also includes a linear adhesive layer.

Note that, although a cross-sectional shape of the threadlike adhesive 2 in the present configuration example is a circular shape, the present embodiment is not limited thereto, and the cross-sectional shape may be an elliptical shape, a rectangular shape such as a quadrangular shape, or the like, in addition to the circular shape. However, the structure and the size including the diameter of the threadlike adhesive 2 are not particularly limited, and the structures and materials of the core material and the adhesive layer are not particularly limited.

Specific examples of an application of the threadlike adhesive 2 include an application to fix cables such as electric wires or optical fibers, optical fiber sensors such as an LED fiber light and fiber Bragg gratings (FBG), various wire members (linear members) such as a thread, a string, and a wire, and a narrow member, in a desired form. Further, the threadlike adhesive 2 can be used as a dam material for preventing squeezing out of a glue or an adhesive when a glue or an adhesive is applied to an adhesion object (adherend). The dam material can be used, for example, to prevent squeezing out of a sealing resin used for bonding an optical panel. In the case where the threadlike adhesive 1 is used as a dam material, the threadlike adhesive 1 may be peeled off or remain after the glue or the adhesive is cured. However, the application of the threadlike adhesive 2 is not particularly limited.

Supplementary Description

Here, features of the threadlike adhesive sticking apparatus and the threadlike adhesive sticking method according to the embodiment of the present invention described above will be briefly summarized and listed in the following [1] to [14].

[1] A threadlike adhesive sticking apparatus including:

a chuck unit disposed upstream of a nozzle, configured to guide a threadlike adhesive to the nozzle, and configured to chuck the threadlike adhesive; and a first moving mechanism configured to move the chuck unit, in a state of chucking the threadlike adhesive, to be farther away from the nozzle.

[2] The threadlike adhesive sticking apparatus according to the above [1], in which the chuck unit includes a first roller that guides the threadlike adhesive to the nozzle, and a second roller that chucks the threadlike adhesive between the first roller and the second roller, and the threadlike adhesive sticking apparatus further includes a second moving mechanism configured to move at least one of the first roller and the second roller to sandwich the threadlike adhesive.

[3] The threadlike adhesive sticking apparatus according to the above [1] or [2], in which in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the first moving mechanism is configured to move the chuck unit, in a state of chucking the threadlike adhesive, into a region defined by the virtual straight line in a range of the rotation angle θ of 90°≤θ≤270°.

[4] The threadlike adhesive sticking apparatus according to any one of the above [1] to [3], further including:

a contact unit disposed upstream of the nozzle and downstream of the chuck unit and configured to be in contact with at least one portion of the threadlike adhesive guided from the chuck unit to the nozzle.

[5] The threadlike adhesive sticking apparatus according to the above [4], in which the contact unit includes a third roller, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the first moving mechanism is configured to move the chuck unit, in a state of chucking the threadlike adhesive, into a region defined by the virtual straight line in a range of the rotation angle θ of 90°≤θ≤180°.

[6] The threadlike adhesive sticking apparatus according to the above [4], in which the contact unit includes a third roller and a fourth roller disposed to sandwich the threadlike adhesive guided from the chuck unit to the nozzle, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the first moving mechanism is configured to move the chuck unit, in a state of chucking the threadlike adhesive, into a region defined by the virtual straight line in a range of the rotation angle θ of 90°≤θ≤270°.

[7] The threadlike adhesive sticking apparatus according to the above [4], in which the contact unit includes an annular member into which the threadlike adhesive guided from the chuck unit to the nozzle is insertable, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the first moving mechanism is configured to move the chuck unit, in a state of chucking the threadlike adhesive, into a region defined by the virtual straight line in a range of the rotation angle θ of 90°≤θ≤270°.

[8] A threadlike adhesive sticking method in a threadlike adhesive sticking apparatus including a chuck unit disposed upstream of a nozzle, configured to guide a threadlike adhesive to the nozzle, and configured to chuck the threadlike adhesive, the method including:

moving the chuck unit, in a state of chucking the threadlike adhesive, to be farther away from the nozzle.

[9] The threadlike adhesive sticking method according to the above [8], in which the chuck unit includes a first roller that guides the threadlike adhesive to the nozzle, and a second roller that chucks the threadlike adhesive between the first roller and the second roller, and the threadlike adhesive sticking apparatus further includes a second moving mechanism configured to move at least one of the first roller and the second roller to sandwich the threadlike adhesive.

[10] The threadlike adhesive sticking method according to the above [8] or [9], in which in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the chuck unit in a state of chucking the threadlike adhesive is moved into a region defined by the virtual straight line in a range of the rotation angle θ of 90°≤θ≤270°.

[11] The threadlike adhesive sticking method according to any one of the above [8] to [10], in which the threadlike adhesive sticking apparatus further includes a contact unit disposed upstream of the nozzle and downstream of the chuck unit and configured to be in contact with at least one portion of the threadlike adhesive guided from the chuck unit to the nozzle.

[12] The threadlike adhesive sticking method according to the above [11], in which the contact unit includes a third roller, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the chuck unit in a state of chucking the threadlike adhesive is moved into a region defined by the virtual straight line in a range of the rotation angle θ of 90°≤θ≤180°.

[13] The threadlike adhesive sticking method according to the above [11], in which the contact unit includes a third roller and a fourth roller disposed to sandwich the threadlike adhesive guided from the chuck unit to the nozzle, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the chuck unit in a state of chucking the threadlike adhesive is moved into a region defined by the virtual straight line in a range of the rotation angle θ of 90°≤θ≤270°.

[14] The threadlike adhesive sticking method according to the above [11], in which the contact unit includes an annular member into which the threadlike adhesive guided from the chuck unit to the nozzle is insertable, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the chuck unit in a state of chucking the threadlike adhesive is moved into a region defined by the virtual straight line in a range of the rotation angle θ of 90°≤θ≤270°.

INVENTIVE EXAMPLE AND COMPARATIVE EXAMPLE

Figure 8:
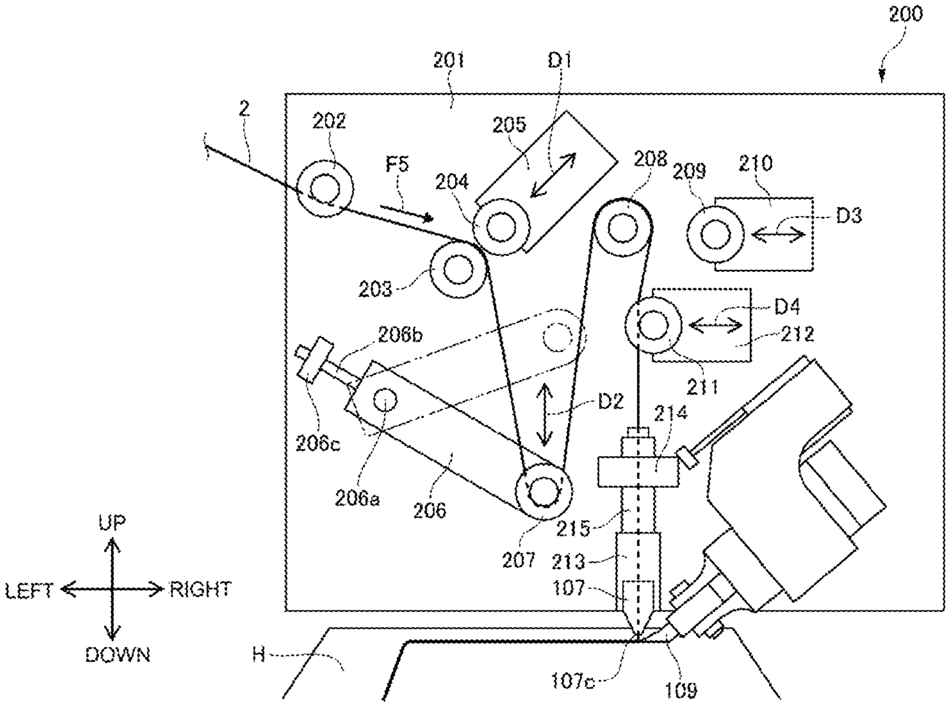
FIG. 8 is a schematic front view of a threadlike adhesive sticking apparatus according to a comparative example.

The inventors of the present invention have used the threadlike adhesive sticking apparatus 200 according to the second embodiment as an inventive example and the threadlike adhesive sticking apparatus 200 according to a comparative example shown in FIG. 8 to compare results of an extra length treatment after cutting the threadlike adhesive 2.

The threadlike adhesive sticking apparatus 200 according to the comparative example includes rollers 208, 209, and 211 and moving units 210 and 212, instead of the rollers 221, 222, and 224 and the moving unit 223 (see FIG. 2) as the first moving mechanism and the second moving mechanism in the threadlike adhesive sticking apparatus 200 according to the second embodiment shown in FIG. 5A, FIG. 5B, FIG. 5C, and FIG. 5D. The roller 208 is attached to the upper right of the roller 207 and the right side of the roller 204 in the attachment plate 201. The roller 208 guides the threadlike adhesive 2 pulled out by the rollers 203 and 204 and passing the roller 207 to the pressing mechanism BU (nozzle 107) provided directly below the roller 208.

On a right side of the roller 208, that is, above the nozzle 107, the roller 209 attached to a left end portion of the moving unit 210 that is moved in a direction of an arrow D3 (left-right direction) with respect to the attachment plate 201 is disposed. The roller 209 is disposed adjacent to the roller 203 such that the threadlike adhesive 2 can be nipped between the roller 209 and the roller 208 when being positioned at the leftmost position. The roller 209 provided upstream of the nozzle 107 nips (chucks) the threadlike adhesive 2 with the roller 208 when the sticking of the threadlike adhesive 2 is completed and the nozzle 107 is raised. In this state, the threadlike adhesive 2 is cut at a position close to the adherend H.

The roller 211 is disposed below the rollers 208 and 209 and the moving unit 210, that is, above the nozzle 107, and is attached to a left end portion of the moving unit 212 that is moved in a direction of an arrow D4 (left-right direction) with respect to the attachment plate 201. As an example, when the roller 211 is positioned on a right side, the roller 211 allows the threadlike adhesive 2 to pass therethrough and guides the threadlike adhesive 2 into the nozzle 107, and when the threadlike adhesive 2 is cut, the roller 211 is moved to the left side to press the threadlike adhesive 2 in a left direction, and moves a cut tip end portion (lower end portion) of the threadlike adhesive 2 upward. By raising the lower end portion of the threadlike adhesive 2 after cutting the threadlike adhesive 2, it is possible to reduce an extra length at the start (start point) of the next sticking of the threadlike adhesive 2. In the case of allowing the threadlike adhesive 2 to pass through a right side of the roller 211, the roller 211 is moved to the right side to pull the threadlike adhesive 2 in a right direction, so that the lower end portion of the threadlike adhesive 2 can be moved upward.

The diameter of the threadlike adhesive 2 used in the experiment is 0.45 mm, and the inner diameter of the nozzle 107 was 1.0 mm. With respect to five samples (n=1 to 5), the extra length immediately after cutting was set to 5 mm, and the apparatus was operated to perform rewinding under control such that the extra length after rewinding was 2.5 mm. Table 1 below shows the extra length after rewinding (unit: mm). Note that, in the threadlike adhesive sticking apparatus 200 according to the inventive example, the rotation angle θ was set to θ=90° as shown in FIG. 5B.

TABLE 1

| | Inventive Example ((B) in FIG. 5) | Comparative Example (FIG. 8) |
|---|---|---|
| n = 1 | 2.5 | 1.2 |
| n = 2 | 2.5 | Not measurable (1) |
| n = 3 | 2.4 | 2.0 |
| n = 4 | 2.5 | Not measurable (2) |
| n = 5 | 2.5 | 2.5 |

As is clear from the table, the threadlike adhesive sticking apparatus 200 according to the inventive example has realized a stable extra length, but the threadlike adhesive sticking apparatus 200 according to the comparative example has not realized a stable extra length and has a variation in extra length. Noted that, "not measurable (1)" in the table means that the threadlike adhesive 2 enters the inside of the nozzle 107 in reaction to the upper portion of the nozzle 107. In addition, "not measurable (2)" means that the threadlike adhesive 2 slips within the diameter of the nozzle 107 and enters the inside of the nozzle 107.

In the threadlike adhesive sticking apparatus 200 according to the comparative example, the roller 211 was directly adjacent to the nozzle 107. Therefore, the threadlike adhesive 2 was easily inclined, and the threadlike adhesive 2 was pulled up while being in contact with the upper end portion of the nozzle 107. As a result, it is thought that, in the threadlike adhesive sticking apparatus 200 according to the comparative example, the threadlike adhesive 2 is easily influenced by a play of the inner diameter of the nozzle 107 and friction with the nozzle 107, and even when an operation of reducing the extra length is performed, the extra length is not stable, or the threadlike adhesive 2 enters the nozzle 107 due to the reasons for the not measurable (1) and (2) described above.

On the other hand, in the threadlike adhesive sticking apparatus 200 according to the inventive example, the moving unit 223 as the first moving mechanism pulled up and rewound the threadlike adhesive 2 chucked by the chuck unit 220 to the upstream side by moving the chuck unit 220 in the state of chucking the threadlike adhesive 2 to be farther away from the nozzle 107. Therefore, it is thought that the threadlike adhesive 2 is hardly inclined, the threadlike adhesive 2 is hardly influenced by the nozzle 107, and the extra length is stabilized.

Note that, the present invention is not limited to the embodiments described above, and modifications, improvements, and the like can be made as appropriate. Materials, shapes, sizes, numerical values, forms, numbers, arrangement locations, and the like of components in the embodiments described above are set as desired and are not limited as long as the present invention can be achieved. In addition, the present invention is not limited to the embodiments described above, and can be made in various modifications within the scope of the claims, and embodiments obtained by appropriately combining technical methods disclosed in different embodiments are also included in the technical scope of the present invention.

INDUSTRIAL APPLICABILITY

With the threadlike adhesive sticking apparatus and the threadlike adhesive sticking method according to the present invention, it is possible to stably ensure the extra length of the threadlike adhesive. Therefore, the present invention can be applied to adhesion work in various fields.

REFERENCE SIGNS LIST

2 threadlike adhesive
107 nozzle
220 chuck unit
221 roller (first roller)
222 roller (second roller)
223 moving unit (first moving mechanism, second moving mechanism)
224 third roller
225 fourth roller
226 annular member
200 threadlike adhesive sticking apparatus

The invention claimed is:

1. A threadlike adhesive sticking apparatus comprising:

a chuck unit disposed upstream of a nozzle, configured to guide a threadlike adhesive to the nozzle, and configured to chuck the threadlike adhesive; and a first moving mechanism configured to move the chuck unit, in a state of chucking the threadlike adhesive, to be farther away from the nozzle.

2. The threadlike adhesive sticking apparatus according to claim 1, further comprising:

a contact unit disposed upstream of the nozzle and downstream of the chuck unit and configured to be in contact with at least one portion of the threadlike adhesive guided from the chuck unit to the nozzle.

3. The threadlike adhesive sticking apparatus according to claim 2, wherein the contact unit includes a third roller, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the first moving mechanism is configured to move the chuck unit, in a state of chucking the threadlike adhesive, into a region defined by the virtual straight line in a range of the rotation angle θ of 90°≤θ≤180°.

4. The threadlike adhesive sticking apparatus according to claim 2, wherein the contact unit includes a third roller and a fourth roller disposed to sandwich the threadlike adhesive guided from the chuck unit to the nozzle, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the first moving mechanism is configured to move the chuck unit, in a state of chucking the threadlike adhesive, into a region defined by the virtual straight line in a range of the rotation angle θ of 90°≤θ≤270°.

5. The threadlike adhesive sticking apparatus according to claim 2, wherein the contact unit includes an annular member into which the threadlike adhesive guided from the chuck unit to the nozzle is insertable, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the first moving mechanism is configured to move the chuck unit, in a state of chucking the threadlike adhesive, into a region defined by the virtual straight line in a range of the rotation angle θ of 90°≤θ≤270°.

6. The threadlike adhesive sticking apparatus according to claim 1, wherein the chuck unit includes a first roller that guides the threadlike adhesive to the nozzle, and a second roller that chucks the threadlike adhesive between the first roller and the second roller, and the threadlike adhesive sticking apparatus further comprises a second moving mechanism configured to move at least one of the first roller and the second roller to sandwich the threadlike adhesive.

7. The threadlike adhesive sticking apparatus according to claim 1, wherein in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the first moving mechanism is configured to move the chuck unit, in a state of chucking the threadlike adhesive, into a region defined by the virtual straight line in a range of the rotation angle θ of 90°≤θ≤270°.

8. A threadlike adhesive sticking method in a threadlike adhesive sticking apparatus including a chuck unit disposed upstream of a nozzle, configured to guide a threadlike adhesive to the nozzle, and configured to chuck the threadlike adhesive, the method comprising:

moving the chuck unit, in a state of chucking the threadlike adhesive, to be farther away from the nozzle.

9. The threadlike adhesive sticking method according to claim 8, wherein the threadlike adhesive sticking apparatus further includes a contact unit disposed upstream of the nozzle and downstream of the chuck unit and configured to be in contact with at least one portion of the threadlike adhesive guided from the chuck unit to the nozzle.

10. The threadlike adhesive sticking method according to claim 9, wherein the contact unit includes a third roller, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the chuck unit in a state of chucking the threadlike adhesive is moved into a region defined by the virtual straight line in a range of the rotation angle θ of 90°≤θ≤180°.

11. The threadlike adhesive sticking method according to claim 9, wherein the contact unit includes a third roller and a fourth roller disposed to sandwich the threadlike adhesive guided from the chuck unit to the nozzle, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the chuck unit in a state of chucking the threadlike adhesive is moved into a region defined by the virtual straight line in a range of the rotation angle θ of 90°≤θ≤270°.

12. The threadlike adhesive sticking method according to claim 9, wherein the contact unit includes an annular member into which the threadlike adhesive guided from the chuck unit to the nozzle is insertable, in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the chuck unit in a state of chucking the threadlike adhesive is moved into a region defined by the virtual straight line in a range of the rotation angle θ of 90°≤θ≤270°.

13. The threadlike adhesive sticking method according to claim 8, wherein the chuck unit includes a first roller that guides the threadlike adhesive to the nozzle, and a second roller that chucks the threadlike adhesive between the first roller and the second roller, and the threadlike adhesive sticking apparatus further includes a second moving mechanism configured to move at least one of the first roller and the second roller to sandwich the threadlike adhesive.

14. The threadlike adhesive sticking method according to claim 8, wherein in a state where the chuck unit chucks the threadlike adhesive, a virtual straight line extending from a chuck position at which the chuck unit chucks the threadlike adhesive toward the nozzle is defined, a rotation angle in a case where the virtual straight line is rotated counterclockwise about the chuck position as a rotation center is defined as a rotation angle θ, and the rotation angle θ of the virtual straight line along a feeding direction of the threadlike adhesive from the nozzle is defined as θ=0°, and the chuck unit in a state of chucking the threadlike adhesive is moved into a region defined by the virtual straight line in a range of the rotation angle θ of 90°≤θ≤270°.

* * * * *